United States Patent
Ihde

(12) 
(10) Patent No.: US 9,145,112 B1
(45) Date of Patent: Sep. 29, 2015

(54) PIVOTING SNOWBRUSH

(71) Applicant: Hopkins Manufacturing Corporation, Emporia, KS (US)

(72) Inventor: David Ihde, Admire, KS (US)

(73) Assignee: Hopkins Manufacturing Corporation, Emporia, KS (US)

(*) Notice: Subject to any disclaimer, the term of this patent is extended or adjusted under 35 U.S.C. 154(b) by 141 days.

(21) Appl. No.: 14/025,036

(22) Filed: Sep. 12, 2013

Related U.S. Application Data

(60) Provisional application No. 61/702,455, filed on Sep. 18, 2012.

(51) Int. Cl.
| | |
|---|---|
| *A46B 7/02* | (2006.01) |
| *A47L 13/12* | (2006.01) |
| *B60S 3/04* | (2006.01) |
| *A46B 5/00* | (2006.01) |

(52) U.S. Cl.
CPC .............. *B60S 3/045* (2013.01); *A46B 5/0054* (2013.01); *A46B 7/02* (2013.01); *A47L 13/12* (2013.01)

(58) Field of Classification Search
CPC .......... B60S 3/045; A46B 7/02; A46B 7/023; A46B 5/0054; A46B 5/0058; A46B 5/0075; A46B 5/0083; A46B 2200/302; A47L 13/11; A47L 13/12

USPC ................ 15/172, 229.6, 111, 114, 117, 121, 15/144.1
See application file for complete search history.

(56) References Cited

U.S. PATENT DOCUMENTS

| | | | |
|---|---|---|---|
| 4,673,307 A * | 6/1987 | Prestele et al. ................. | 401/289 |
| 6,481,041 B1 * | 11/2002 | Ingram .......................... | 15/111 |
| 6,990,705 B1 * | 1/2006 | Schouten et al. ............... | 15/111 |
| 7,155,770 B2 * | 1/2007 | Anderson et al. ............... | 15/111 |
| 8,449,682 B2 * | 5/2013 | Perelli et al. ................... | 134/6 |
| 2011/0188923 A1 * | 8/2011 | Lafleur et al. .................. | 403/53 |

* cited by examiner

*Primary Examiner* — Laura C Guidotti
(74) *Attorney, Agent, or Firm* — Hovey Williams LLP

(57) ABSTRACT

A pivoting snowbrush for removing snow, ice, or debris from a surface, the pivoting snowbrush including an elongated handle, a brush, and a brush mount fixed to the handle and pivotally connected to the brush. The brush may be shiftable about the brush mount between a first orientation in which the brush extends generally parallel to the handle and a second orientation in which the brush extends generally perpendicular to the handle. The brush may include a brush body and a debris removal component attached to the brush body. The brush body may have a primary portion, a pivot extending from the primary portion, and an actuatable detent device integrally molded to the primary portion. The brush mount may rotatably connect to the pivot and may have features for selectively engaging with the detent device, thus selectively fixing the brush in the first orientation and/or the second orientation.

17 Claims, 3 Drawing Sheets

PIVOTING SNOWBRUSH

RELATED APPLICATIONS

This application claims priority benefit of a provisional application entitled, "Pivoting Snowbrush," Ser. No. 61/702,455, filed Sep. 18, 2012 and incorporated by reference herein in its entirety.

BACKGROUND

Various tools have been created to remove ice and snow from vehicles. First, a traditional floor broom was used. Over time, snow removal tools became more sophisticated, combining a brush for snow removal and a scraper blade for ice/frost removal. Some snow removal tools also extend, pivot, and curve and can be made of metal, plastic, and wood.

Snow removal tools that have a brush mounted along a length-wise axis of an elongated handle are fairly easy to stow. Such axis-mounted snow removal tools may be swept side-to-side to remove snow from a vehicle. This side-to-side action works well if there is not a large amount of snow on the vehicle. However, with large amounts of snow and/or when removing snow from the roof of a car, this side-to-side action is not ideal. For example, the side-to-side motion used on the roof of a vehicle just moves the snow from the roof to a hood or trunk, requiring the snow to be moved twice in order to clean the vehicle.

Snow removal tools that have the brush mounted perpendicular to the length-wise axis of the elongated handle can be pushed and pulled forward and back to remove snow from a vehicle. This works well for removal of large amounts of snow, such as on the roof of the vehicle, by moving the snow off the roof onto the ground. However, perpendicularly-mounted brushes take up more space and are therefore more difficult to transport, display, and store in small spaces, such as glove boxes.

Snow removal tools with pivoting brush heads benefit from the advantages of both axis-mounted and perpendicular-mounted brushes, because the pivoting brush head can be shifted between the axial or perpendicular-to-the-handle positions. These pivoting brush heads typically use a spring-based detent to lock the brush in a given position. The use of a spring increases the number of parts and assembly labor required to manufacture the snow removal tool having this pivoting brush head. Furthermore, attempts at compressing the spring in a small space can lead to mechanical failure of the pivoting brush head.

SUMMARY

Embodiments of the present invention solve the above described problems by providing a pivoting snowbrush for removing snow, ice, or other debris from a surface that does not require metal springs, screws, or pins. The pivoting snow brush may include an elongated handle, a brush, and a brush mount fixed to the handle and pivotally connected to the brush.

The brush may be shiftable about the brush mount between a first orientation in which the brush extends generally parallel to the handle and a second orientation in which the brush extends generally perpendicular to the handle. The brush may include a brush body and a debris removal component attached to the brush body. The brush body may have a primary portion to which the debris removal component is fixed, a pivot extending from the primary portion, and an actuatable detent device.

The brush mount may connect the brush body to one end of the handle and may include an outer mount and/or an inner mount. The outer mount may rotatably attach to the pivot of the brush body, fixedly attach to the handle, and may selectively engage with the detent device to selectively fix the brush in the first orientation and/or the second orientation. The inner mount may be fixable within the outer mount to retain the pivot between the outer mount and the inner mount, such that the pivot is rotatable therebetween.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein.

Figure 1:
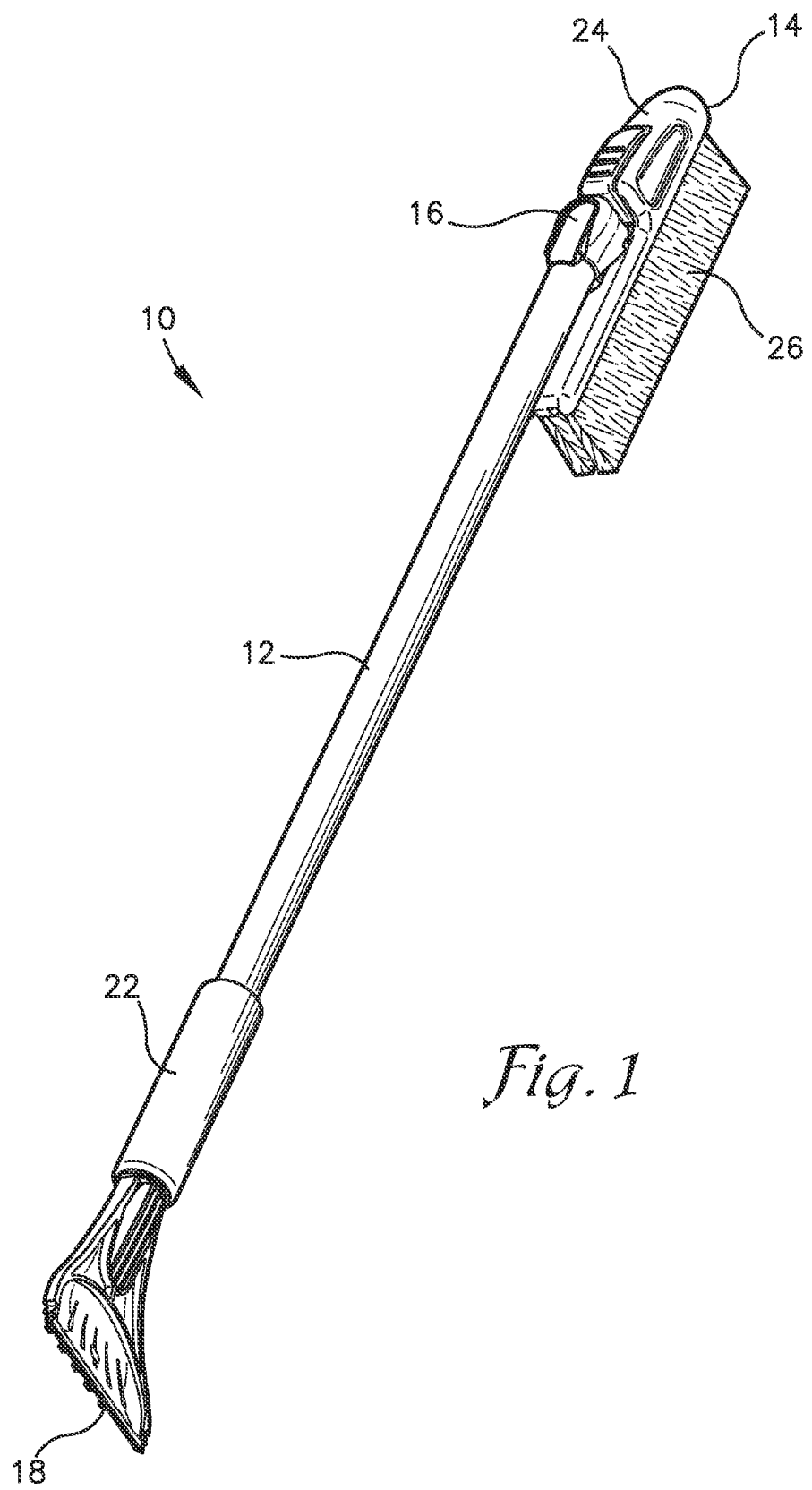
FIG. 1 is a perspective view of a pivoting snowbrush constructed in accordance with embodiments of the invention and illustrated in a first orientation, with its brush substantially parallel to its handle.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention is intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the present invention is defined only by claims presented in subsequent regular utility applications, along with the full scope of equivalents to which such claims are entitled.

In this description, references to "one embodiment," "an embodiment," or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, step, etc. described in one embodiment may also be included in other embodiments, but is not necessarily included. Thus, the present technology can include a variety of combinations and/or integrations of the embodiments described herein.

Figure 2:
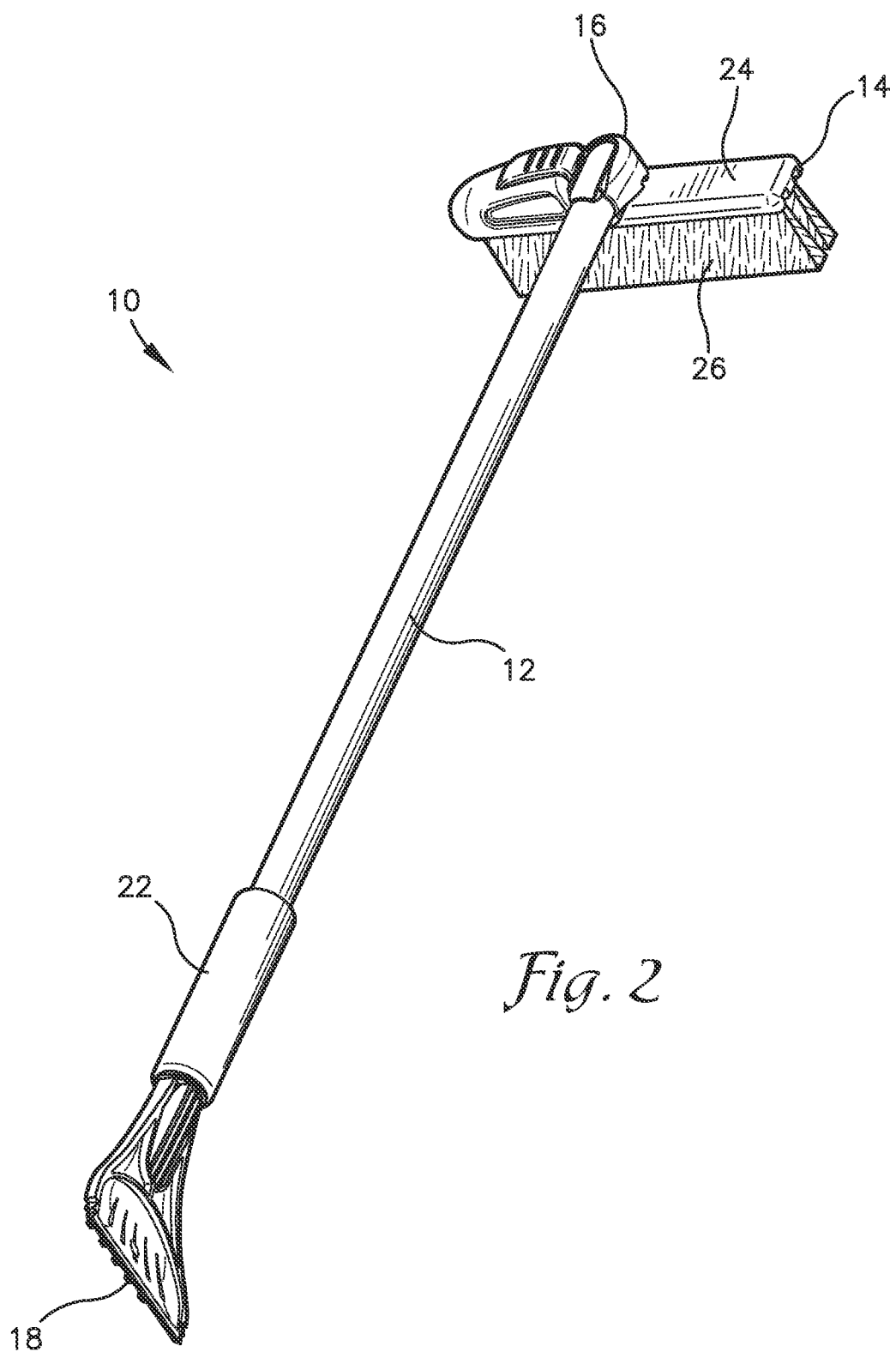
FIG. 2 is a perspective view of the pivoting snowbrush of FIG. 1 illustrated in a second orientation, with its brush substantially perpendicular to its handle.

Embodiments of the present invention provide a pivoting snowbrush 10 for removing snow, ice, or other debris from a surface, such as a car or other vehicle. As illustrated in FIG. 1, the pivoting snowbrush 10 comprises an elongated handle 12, a brush 14, and a brush mount 16 fixed to the handle 12 and pivotally connected to the brush 14. The brush 14 is shiftable between a first orientation generally parallel to the handle 12, as illustrated in FIG. 1, and a second orientation generally perpendicular to the handle 12, as illustrated in FIG. 2. The brush mount 16 may selectively engage with components of the brush 14 to temporarily mechanically fix the brush 14 at the first or second orientations as desired. In some embodiments of the invention, the pivoting snowbrush 10 may also comprise a squeegee and/or ice scraper 18 fixed to the handle 12. The pivoting snowbrush 10 may advantageously not require metal springs, screws, or pins.

Figure 3:
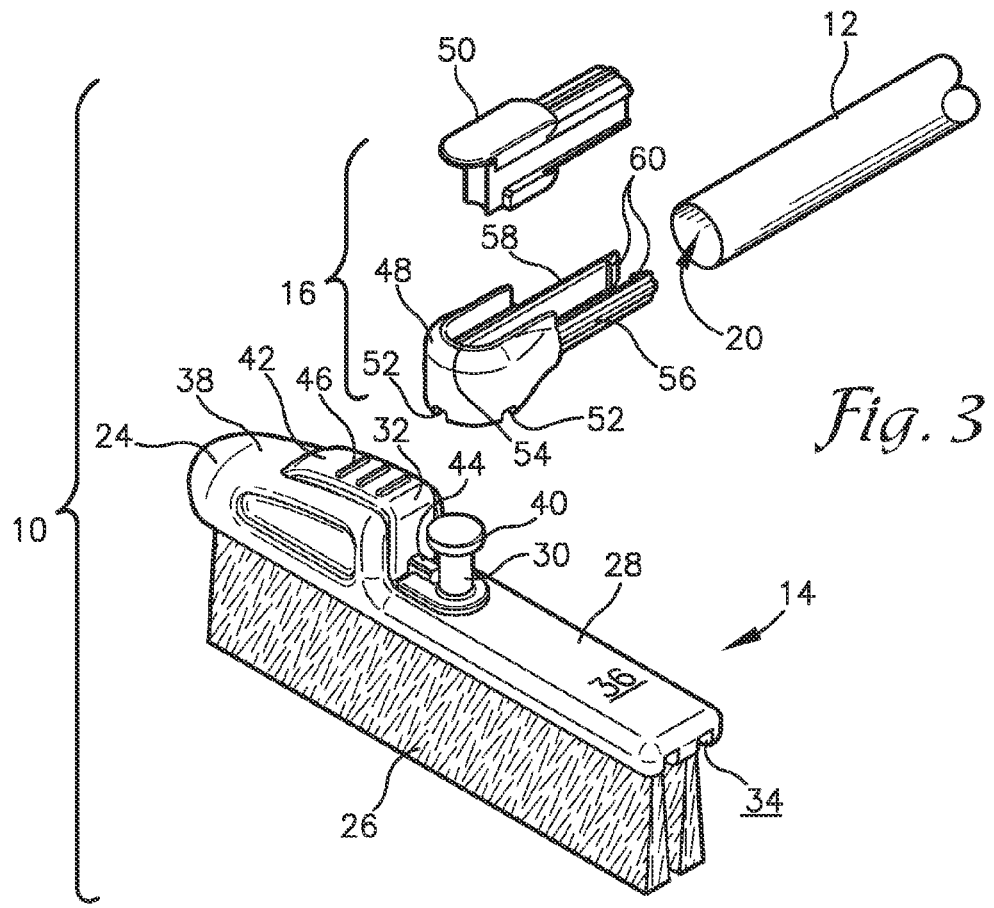
FIG. 3 is a fragmentary exploded perspective view of the pivoting snowbrush of FIG. 1, illustrating the handle, the brush, and a handle mount configured to pivotally attach the brush to the handle.

The handle 12 may be an elongated rigid structure having first and second opposing ends. In some embodiments of the invention, the handle 12 may be hollow with openings 20, as illustrated in FIG. 3, located at the first and second opposing ends. Alternatively, the handle may be a solid elongated cylinder with at least one pocket or cavity formed at one or both ends, serving as the openings 20 configured for receiving the brush 14 and/or the brush mount 16 therein. The handle 12 may be, for example, a hollow metal or plastic cylinder. However, the handle 12 may be made of any rigid material formed into any shape without departing from the scope of the invention. The handle 12 may additionally comprise a grip attachment 22 with a slip-resistant surface.

The brush 14 may also broadly be referenced herein as a head of the pivoting snowbrush 10. As illustrated in FIGS. 1 and 2, the brush 14 may be located at the first end of the handle 12 and rotatably or shiftably attached thereto via the brush mount 16. Additionally, the squeegee and/or ice scraper 18 may be fixed to the second end of the handle 12. Alternatively, the squeegee and/or ice scraper 18 may be rotatably or shiftably attached to the second end of the handle 12 in a manner similar to the attachment described herein between the handle 12 and the brush 14. In another alternative embodiment of the invention, the brush 14 may be fixed to the first end of the handle 12 while the squeegee and/or the ice scrapper 18 is shiftably attached to the second end of the handle 12. In yet another alternative embodiment of the invention, the squeegee and/or the ice scraper 18 may be fixed to the brush 14 at the first end of the handle 12. In still another alternative embodiment of the invention, the brush 14 described herein may be replaced with the squeegee or the ice scraper 18. However, in some embodiments of the invention, the squeegee and/or the ice scraper 18 may be omitted entirely without departing from the scope of the invention.

Figure 4:
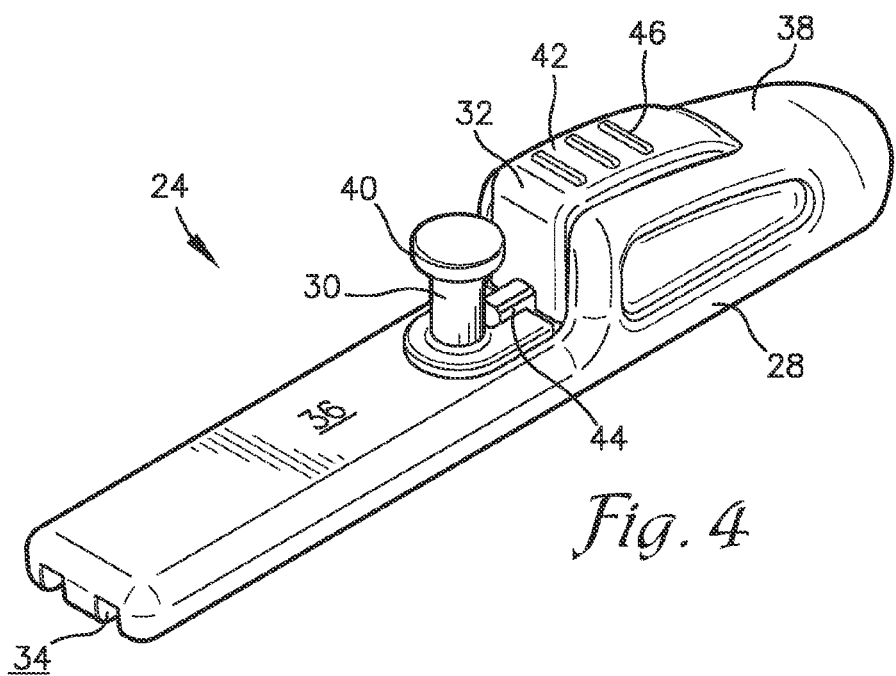
FIG. 4 is a perspective view of a brush body of the brush of FIG. 1.

The brush 14 may have a brush body 24 with a debris removal component 26 attached thereto. The debris removal component 26 may be any ice, snow, or debris-removing device or surface, such as a plurality of bristles, an ice scraper, a squeegee, or a foam head or foam-based head. As illustrated in FIGS. 3 and 4, the brush body 24 may be one integrally-formed or integrally-molded rigid part and may include a primary portion 28, a pivot 30, and a detent device 32. The primary portion 28 may secure the debris removal component 26 to the brush body. The primary portion 28 may be elongated and may have a front face 34 to which the debris removal component 26 is affixed and a rear face 36 opposite the front face 34. The rear face 36 may include a raised portion 38 to which the detent device 32 may be attached. In some embodiments of the invention, the rear face 36 and/or the raised portion 38 may have a cavity (not shown) formed therein or therethrough for receiving a portion of the detent device 32 when the detent device 32 is manipulated.

The pivot 30 may extend from the rear face 36 of the primary portion of the brush body 24 proximate to the raised portion 38 thereof and may be configured to pivotally attach to the brush mount 16. The pivot 30 may be a pivot pin, shaft, post, cylinder, or other protrusion fixed to and extending from the primary portion 28. For example, the shape of the pivot 30 could be a round protrusion having a number of flats placed around its diameter to reduce friction or the probability of water freezing between the pivot 30 and the brush mount 16. The pivot 30 may also comprise a groove or a ridge 40 at one end to restrain movement between the brush mount 16 and the pivot 30 in an axial direction of the pivot 30.

The detent device 32 may be a one piece structure that requires no springs to operate. The detent device 32 may comprise a resilient member 42 and a protrusion 44. The resilient member 42 may function to move the protrusion 44 into and out of one or more grooves of the brush mount 16, as later described herein. The resilient member 42 may be a movable arm integrally formed with the primary portion 28 of the brush body 24 and configured to flex under force toward the primary portion 28. Specifically, the resilient member 42 may be formed to achieve a desired flexibility and resiliency by varying a cross section of the resilient member 42 and/or by molding the resilient member 42 in an elevated position on the primary portion 28 of the brush body 24, as illustrated in FIG. 3. For example, the resilient member 42 may be made of plastic with a first end integrally molded to the raised portion 38 of the rear face 36 and an opposing second end unattached and capable of flexing toward and away from the primary portion 28 of the brush body 24. The resilient member 42 may also have a ribbed or otherwise slip-resistant portion 46 on a surface thereof configured for being pressed in a slip-resistant manner by an operator's fingers or thumb.

In some embodiments of the invention, the resilient member 42 is naturally biased in a first position a space away from the primary portion 28 of the brush body 24 and may be pressed inward toward the primary portion 28 of the brush body 24 to a second position. The resilient member 42 may be configured to naturally spring back to the first position once inward pressure in the direction toward the primary portion 28 is released from the resilient member 42. In the second position, the second end of the resilient member 42 may be pressed into the cavity of the brush body 24.

In some embodiments of the invention, the resilient member 42 may be molded in a position beyond an "at rest" position where the protrusion 44 and grooves of the brush mount 16 are fully mated, to provide mating force between the protrusion 44 and the brush mount 16. Note that the "naturally-biased" first position of the resilient member 42 described herein may be the position at which the resilient member 42 is molded and/or the position at which the resilient member 42 rests when the protrusion 44 is fully mated in one of the grooves of the brush mount 16 described below.

The protrusion 44 of the detent device 32 may be integrally formed with the resilient member 42 and may protrude in a direction away from the primary portion 28 of the brush body 24. The protrusion 44 may be located proximate to the second end of the resilient member 42, such that actuation of the resilient member 42 toward the primary portion 28 of the brush body 24 moves the protrusion 44 in a direction toward the primary portion 28. The protrusion 44 may be a tab, a square or rectangular block, a ledge, or any type of protrusion of any shape and size. In some embodiments of the invention, the protrusion 44 may also be formed into shapes with grooves, reverse angles, and/or tapered edges.

In some alternative embodiments of the invention, the detent device 32 may be a separate piece from the primary portion 28 of the brush body 24. The separate piece could be formed and attached via co-injection molding or formed as true separate pieces and mechanically attached or snapped together. This may allow a color and/or material of the detent device 32 and the primary portion 28 to be different. This color differentiation may be advantageous for identifying where to press the resilient member 42. A different material used for the detent device 32 may allow for adjusting spring force of the resilient member 42, allowing it to be configured in different shapes or relative locations on the primary portion 28 of the brush body 24. The different material used for the detent device 32 may also allow for modifying cost of the pivoting snowbrush 10.

As illustrated in FIG. 3, the brush mount 16 may be rotatable about the pivot 30 and may selectively engage with the detent device 32 on the brush body 24 to hold the brush 14 at desired predetermined orientations (e.g., the first orientation and the second orientation) relative to the brush mount 16 and the handle 12. The brush mount 16 may comprise an outer mount 48 and an inner mount 50. The inner mount 50 may be configured to slide into a portion of the outer mount 48 and cooperatively retain the pivot 30 between the inner mount 50 and the outer mount 48. The inner mount 50 may be fixed to the outer mount 48 and both the outer and inner mounts 48,50 may cooperatively rotate about the pivot 30. With proper shaping and sizing of the brush mount 16 and the corresponding opening 20 of the handle 12, the handle 12 may press the outer mount 48 into the inner mount 50, insuring the pivot 30 is firmly retained in the brush mount 16 under large forces.

The outer mount 48 may rotatably attach to the pivot 30 of the brush body 24 and fixedly attach to the elongated handle 12. The outer mount 48 may also be configured to selectively engage with the detent device 32 to selectively fix the brush 14 in the first orientation and the second orientation. Specifically, the outer mount 48 may have grooves 52 formed therein sized and shaped to match the protrusion 44 of the brush body 24. The grooves 52 may be cavities formed on a surface of the outer mount 48 that is adjacent the rear face 36 of the brush body's primary portion 28. The grooves 52 may be spaced apart approximately 90-degrees from each other, thereby allowing the brush 14 to be maintained in the first orientation, parallel to the handle 12, and in the second orientation, perpendicular to the handle 12. Note that any quantity and spacing of grooves 52 may be provided in order to selectively fix the brush body 24 in any number of orientations relative to the handle 12. Tapered edges on the protrusion 44 and/or on the grooves 52 may be added to facilitate mating of the protrusion 44 with any one of the grooves 52.

In some embodiments of the invention, the outer mount 48 may have a substantially U-shaped configuration, comprising an arcuate portion 54 extending between two end portions 56,58. The two end portions 56,58 may be parallel to each other and spaced apart from each other. The arcuate portion 54 may wrap around the pivot 30 and the two end portions 56,58 may be sized to slide into one of the openings 20 of the handle 12 to be affixed thereto. Thus, at least part of the end portions 56,58 may be contained within openings 20 of the handle 12. The end portions 56,58 may be retained by the fit between the handle 12 and the outer mount 48, such that friction alone locks the brush mount 16 and the handle 12 together. Alternately one or more screws, adhesive, snap locks, or crimps in the handle 12 may be used for attachment. The grooves 52 may be located and spaced about the arcuate portion 54 of the outer mount 48 at approximately 90-degree angles. For example, the outer mount 48 may have three grooves formed therein, one formed at an apex of the arcuate portion 54 and one proximate to each of the two end portions 56,58, as illustrated in FIG. 3.

The inner mount 50 may be configured to limit sliding movement of the pivot 30 within the outer mount 48. Specifically, to ensure that the pivot 30 does not slide toward and away from the arcuate portion 54 in a direction relative to a length of the end portions 56,58 of the outer mount 48, the inner mount 50 may be slid into the outer mount 48 between the end portions 56,58 of the outer mount 48. However, the inner mount 50 must not be placed in such a manner that it limits rotational movement of the pivot 30 between the outer and inner mounts 48,50. In some alternative embodiments of the invention, the inner mount 50 may be a component of the handle 12, integral with or fixed thereto, and may form a snap-fit connection between the outer mount 48 and the handle 12. This may result in a complex shape for the handle 12 and may be achieved via injection molding or other known manufacturing processes.

The inner mount 50 may be fixed to the outer mount 48 using pins and screws. However, in some embodiments of the invention, a locking device 60 may secure the inner mount 50 to the outer mount 48. Specifically, the brush mount 16 may comprise the locking device 60 integrally formed with the inner mount 50 and/or the outer mount 48. The locking device 60 may be configured to limit an amount by which the inner mount 50 can slide away from the arcuate portion 54 of the outer mount 48. For example, as illustrated in FIG. 3, the locking device 60 may be a pair of directional tabs located on the end portions 56,58 of the outer mount 48 and having a substantially triangular or beveled shape. The U-shape of the outer mount 48 may allow the end portions 56,58 to flex around the inner mount 50, expanding as the inner mount 50 passes between the directional tabs. Once the inner mount 50 slides past the directional tabs, the end portions 56,58 of the outer mount 48 may flex back toward each other, closing on the inner mount 50 to prevent it from sliding out from within the outer mount 48.

In some embodiments of the invention, the brush mount 16 and/or the pivot 30 may comprise small ridges protruding therefrom and configured to reduce effects of manufacturing tolerances on clearance between the pivot 30 and brush mount 16. Furthermore, the pivot 30 and/or the brush mount 16 may have grooves formed therein configured to match the ridges of the brush mount 16 and/or the pivot. These ridges and/or matching grooves may be sized such that they create interference between the pivot 30 and the brush mount 16. The ridges may be made of a compressible material, such as rubber, so that during assembly of the brush mount 16 and the pivot 30, the ridges may be collapsed by compression. This may result in a tight fit between the pivot 30 and the brush mount 16, while adding minimal friction to the movement of this joint.

In use, an operator may manipulate the detent device 32 by pressing the resilient member 42 to the second position (i.e., toward the primary portion 28 of the brush body 24), which then removes the protrusion 44 away from and out of one of the grooves 52 of the outer mount 48. The brush 14 may then freely rotate relative to the handle 12 and the brush mount 16 while the protrusion 44 is not held in one of the grooves 52. When the resilient member 42 is released, the shape of the resilient member 42 applies pressure to the protrusion 44 in a direction that will move the protrusion 44 into a first one of the grooves 52 that is rotationally aligned therewith. Specifically, the operator may rotate the brush 14 to the first orientation parallel to the handle 12 (as in FIG. 1) and fix the brush 14 in this first orientation by releasing the resilient member 42 at such a point that the protrusion 44 aligns and mates with one of the grooves 52 most proximate to one of the end portions 56,58 of the U-shaped outer mount 48. The operator may also press the resilient member 42 back to the second position, rotate the brush 14 to the second orientation perpendicular to the handle 12 (as in FIG. 2), and fix the brush 14 in this second orientation by releasing the resilient member 42 at such a point that the protrusion 44 aligns and mates with the one of the grooves 52 at the apex of the arcuate portion 54 of the U-shaped outer mount 48.

Note that the "first orientation," as referenced herein, may refer to the brush 14 being parallel to the handle 12 with the debris removal component 26 facing a first direction and/or the brush 14 being parallel to the handle 12 with the debris removal component 26 facing a second direction that is opposite the first direction relative to the handle 12. Alternatively, the first orientation may refer to the brush 14 being parallel to the handle 12 with the debris removal component 26 facing the first direction, the second orientation may refer to the brush 14 being perpendicular to the handle 12 with the debris removal component 26 facing away from the handle 12, and a third orientation may refer to the brush 14 being parallel to the handle 12 with the debris removal component 26 facing the second direction. The operator may shift the brush 14 between the first, second, and third orientations by pressing or otherwise manipulating the detent device 32 and aligning the protrusion 44 with another one of the grooves 52 before releasing the detent device 32. As noted above, other additional orientations can be achieved by adding additional ones of the grooves 52 to the brush mount 16 without departing from the scope of the invention. For example, adding another groove midway between two of the grooves illustrated in FIG. 3 may allow for a fourth orientation in which the brush is at a substantially 45-degree angle relative to the handle 12.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A pivoting snowbrush for removing snow, ice, or other debris from a surface, the pivoting snowbrush comprising:
   an elongated handle having opposing first and second ends;
   a head comprising a body and a debris removal component fixedly attached to the body, wherein the body comprises:
      a primary portion to which the debris removal component is fixed,
      a pivot fixed to and extending from the primary portion, and
      a detent device integrally molded with the primary portion; and
   a head mount configured for connecting the body to the first end of the handle so that the head is shiftable about the head mount between a first orientation in which the head extends generally parallel to the handle and a second orientation in which the head extends generally perpendicular to the handle, the head mount comprising:
      an outer mount rotatably attached to the pivot of the body, fixedly attachable to the elongated handle, and configured to selectively engage with the detent device to selectively fix the brush in the first orientation and the second orientation,
      wherein the detent device is configured to be flexed by a user to selectively disengage the outer mount,
      wherein the elongated handle has openings formed at the first and second ends,
      wherein the outer mount is U-shaped and comprises an arcuate portion wrapping around the pivot and two end portions sized to slide into one of the openings of the handle, to be affixed thereto.

2. The pivoting snowbrush of claim 1, wherein the head mount further comprises an inner mount fixable within the outer mount and configured to retain the pivot between the outer mount and the inner mount, such that the pivot is rotatable relative to the outer mount and the inner mount.

3. The pivoting snowbrush of claim 2, wherein the inner mount is a component of the handle.

4. The pivoting snowbrush of claim 1, wherein the detent device comprises:
   a resilient member integrally formed with the primary portion of the body and configured to flex under force toward the primary portion, and
   a protrusion integrally formed with the resilient member and extending therefrom,
   wherein the outer mount has a plurality of grooves formed therein,
   wherein the resilient member is naturally biased in a first position in which the protrusion selectively engages any one of the plurality of grooves, thereby preventing rotation of the outer mount relative to the head body,
   wherein the resilient member is configured to be flexed under force toward the primary portion of the body to a second position, thereby retracting the protrusion from the one of the plurality of grooves and allowing rotation of the outer mount relative to the body.

5. The pivoting snowbrush of claim 1, wherein the handle has a grip attachment with a slip-resistant surface.

6. The pivoting snowbrush of claim 1, wherein the debris removal component is at least one of a plurality of bristles, a squeegee, an ice scraper, and a foam head.

7. The pivoting snowbrush of claim 1, wherein a squeegee or an ice scraper is attached to the second end of the handle.

8. A pivoting snowbrush for removing snow, ice, or other debris from a surface, the pivoting snowbrush comprising:
   an elongated handle having opposed first and second ends, wherein an opening or cavity is formed in at least one of the first end or the second end of the handle;
   a head comprising a body and a debris removal component fixedly attached to the body, wherein the body comprises:
      a primary portion to which the debris removal component is fixed,
      a pivot fixed to and extending from the primary portion,
      a resilient member integrally formed with the primary portion and configured to flex from a naturally-biased first position to a second position, and
      a protrusion integrally formed with the resilient member and extending therefrom; and
   a head mount configured for connecting the body to the first end of the handle so that the head is shiftable about the head mount between a first orientation in which the head extends generally parallel to the handle and a second orientation in which the head extends generally perpendicular to the handle, the head mount comprising:
      an outer mount placed around the pivot, rotatable about the pivot, and fixedly attached to the first end of the handle, wherein the outer mount has a plurality of grooves formed therein configured to selectively engage the protrusion of the body when the resilient member is in the naturally-biased first position, thereby preventing rotation of the body relative to the outer mount, and configured to disengage from the protrusion when the resilient member is flexed to the second position, thereby allowing the head to rotatably shift between the first and second orientations, and an inner mount fixed within the outer mount and configured to retain the pivot between the outer mount and the inner mount, such that the pivot is rotatable relative to the outer mount and the inner mount, wherein the outer mount is U-shaped and comprises an arcuate portion wrapping around the pivot and two end portions sized to slide into the opening or cavity of the handle to be affixed thereto.

9. The pivoting snowbrush of claim 8, wherein the head mount further comprises a locking device integrally formed with at least one of the inner mount and the outer mount and configured to hold the inner mount between the two end portions of the outer mount and to limit an amount by which the inner mount can slide away from the arcuate portion of the outer mount.

10. The pivoting snowbrush of claim 8, wherein the handle has a grip attachment with a slip-resistant surface.

11. The pivoting snowbrush of claim 8, wherein the inner mount is a component of the handle and forms a snap-fit connection between the head mount and the handle.

12. The pivoting snowbrush of claim 8, wherein the debris removal component is at least one of a plurality of bristles, a squeegee, an ice scraper, and a foam head.

13. The pivoting snowbrush of claim 8, wherein at least one of a squeegee and an ice scraper is attached to the second end of the handle.

14. A pivoting snowbrush for removing snow, ice, or other debris from a surface, the pivoting snowbrush comprising:

an elongated handle having openings at opposed first and second ends;

a head comprising a body and a debris removal component fixedly attached to the body, wherein the body comprises:

a primary portion to which the debris removal component is fixed, a pivot fixed to and extending from the primary portion, a detent device; and a head mount configured for connecting the body to the first end of the handle so that the head is shiftable about the head mount between a first orientation in which the head extends generally parallel to the handle and a second orientation in which the head extends generally perpendicular to the handle, the head mount comprising:

an U-shaped outer mount comprising an arcuate portion wrapping around the pivot and two end portions slid into the opening at the first end of the handle and affixed to the handle, wherein the outer mount is rotatable about the pivot, wherein the outer mount has a plurality of grooves formed therein configured to selectively engage the detent device, thereby selectively preventing rotation of the body relative to the outer mount and allowing the head to rotatably shift between the first and second orientations, an inner mount fixed within the outer mount and configured to retain the pivot between the outer mount and the inner mount, such that the pivot is rotatable relative to the outer mount and the inner mount, and a locking device integrally formed with at least one of the inner mount and the outer mount and configured to hold the inner mount between the two end portions of the outer mount and to limit an amount by which the inner mount can slide in a direction away from the arcuate portion of the outer mount.

15. The pivoting snowbrush of claim 14, wherein the handle has a grip attachment with a slip-resistant surface.

16. The pivoting snowbrush of claim 14, wherein the inner mount is a component of the handle and forms a snap-fit connection between the head mount and the handle.

17. The pivoting snowbrush of claim 14, further comprising at least one of an ice scraper and a squeegee attached to the second end of the handle.

* * * * *